United States Patent
Kim et al.

(10) Patent No.: US 9,552,133 B2
(45) Date of Patent: Jan. 24, 2017

(54) DISPLAY APPARATUS AND CONTROL METHOD THEREOF

(71) Applicant: SAMSUNG ELECTRONICS CO., LTD., Suwon-si (KR)

(72) Inventors: Byuk-sun Kim, Seoul (KR); Yong-deok Kim, Anyang-si (KR); Hye-jeong Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 749 days.

(21) Appl. No.: 13/706,904

(22) Filed: Dec. 6, 2012

(65) Prior Publication Data

US 2013/0145326 A1 Jun. 6, 2013

(30) Foreign Application Priority Data

Dec. 6, 2011 (KR) .................. 10-2011-0129582

(51) Int. Cl.
*G06F 3/0481* (2013.01)
(52) U.S. Cl.
CPC ................. *G06F 3/04812* (2013.01)
(58) Field of Classification Search
CPC .................................................. G06F 3/04812
USPC ........................................................ 715/862
See application file for complete search history.

(56) References Cited

U.S. PATENT DOCUMENTS

| | | | | |
|---|---|---|---|---|
| 5,642,131 A * | 6/1997 | Pekelney et al. | ............. | 715/862 |
| 6,046,722 A * | 4/2000 | McKiel, Jr. | ......... | G06F 3/04842 |
| | | | | 345/157 |
| 6,137,487 A * | 10/2000 | Mantha | ......................... | 715/767 |
| 6,259,436 B1 * | 7/2001 | Moon | .................. | G06F 3/0488 |
| | | | | 345/173 |
| 6,323,884 B1 * | 11/2001 | Bird et al. | .................... | 715/810 |
| 6,567,109 B1 * | 5/2003 | Todd | .................. | G06F 3/04842 |
| | | | | 715/862 |
| 6,717,600 B2 | 4/2004 | Dutta et al. | | |
| 6,892,360 B1 * | 5/2005 | Pabla et al. | .................... | 715/802 |
| 7,062,717 B2 * | 6/2006 | Scott | ............................. | 715/767 |
| 7,383,517 B2 * | 6/2008 | Baudisch et al. | ............. | 715/857 |
| 7,549,131 B2 * | 6/2009 | Lengeling | ............... | G06F 3/038 |
| | | | | 345/157 |

(Continued)

FOREIGN PATENT DOCUMENTS

WO 2007/113612 A1 10/2007

OTHER PUBLICATIONS

Communication dated May 7, 2013 issued by the European Patent Office in counterpart European Patent Application No. 12195702.1.

*Primary Examiner* — William Bashore
*Assistant Examiner* — Nathan Shrewsbury
(74) *Attorney, Agent, or Firm* — Sughrue Mion, PLLC

(57) ABSTRACT

A display apparatus including: a display unit; a communication unit which receives information about a coordinate from an input device; and an image processor which displays an image including an object and a cursor on the display unit, and moves the cursor toward the object according to a position of the object in the image with respect to information about movement corresponding to a first input coordinate at an input start point and a second input coordinate at an input termination point, wherein the first input coordinate and the second input coordinate are received from the input device through the communication unit.

29 Claims, 8 Drawing Sheets

(56) References Cited

U.S. PATENT DOCUMENTS

| | | | |
|---|---|---|---|
| 8,112,722 B2* | 2/2012 | Chen | G06F 3/04815 715/856 |
| 8,482,521 B2* | 7/2013 | Abe et al. | 345/156 |
| 2003/0142144 A1* | 7/2003 | Balakrishnan | G02B 27/2271 715/848 |
| 2004/0178994 A1* | 9/2004 | Kairls, Jr. | G06F 3/0418 345/173 |
| 2006/0112347 A1* | 5/2006 | Baudisch | G06F 3/0481 715/764 |
| 2006/0132460 A1* | 6/2006 | Kolmykov-Zotov | G06F 3/04812 345/173 |
| 2006/0288314 A1 | 12/2006 | Robertson | |
| 2008/0141149 A1* | 6/2008 | Yee | G06F 3/04886 715/764 |
| 2008/0165133 A1* | 7/2008 | Blumenberg | G06F 3/0482 345/173 |
| 2008/0189629 A1* | 8/2008 | Diederiks | G06F 3/04842 715/762 |
| 2008/0211768 A1* | 9/2008 | Breen | G06F 3/012 345/157 |
| 2009/0251410 A1* | 10/2009 | Mori | G06F 3/04812 345/157 |
| 2010/0100849 A1* | 4/2010 | Fram | G06F 3/0236 715/835 |
| 2010/0262933 A1* | 10/2010 | Kim | G06F 3/0481 715/810 |
| 2010/0306702 A1* | 12/2010 | Warner | G06F 3/0482 715/811 |
| 2011/0138324 A1* | 6/2011 | Sweeney | G06F 3/0481 715/800 |
| 2011/0238690 A1* | 9/2011 | Arrasvuori | G06F 3/04812 707/769 |
| 2012/0044151 A1* | 2/2012 | Wilson | G06F 3/04883 345/173 |
| 2013/0120278 A1* | 5/2013 | Cantrell | G06F 3/04886 345/173 |
| 2013/0125066 A1* | 5/2013 | Klein et al. | 715/862 |

* cited by examiner

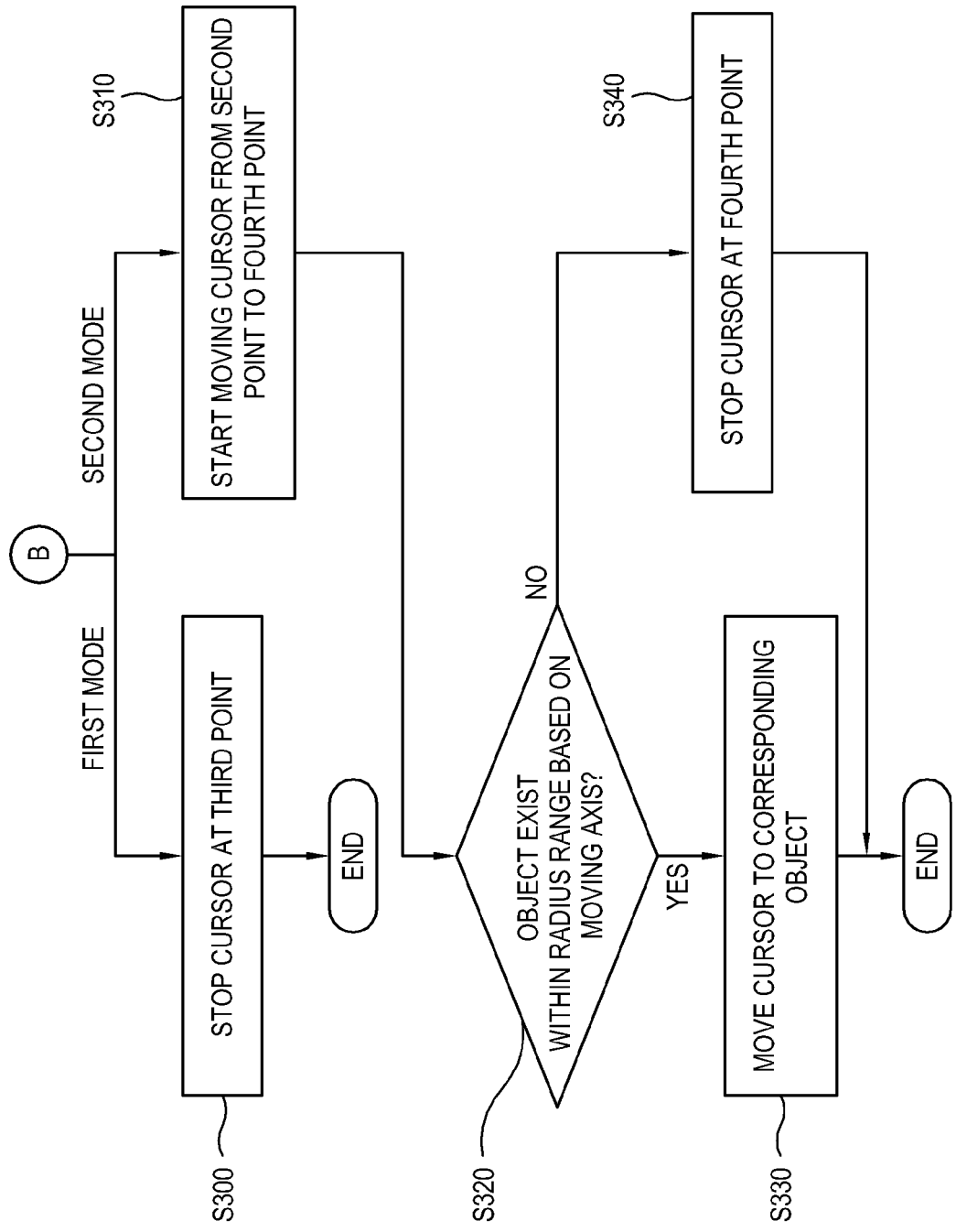

DISPLAY APPARATUS AND CONTROL METHOD THEREOF

CROSS-REFERENCE TO RELATED APPLICATION

This application claims priority from Korean Patent Application No. 10-2011-0129582, filed on Dec. 6, 2011 in the Korean Intellectual Property Office, the disclosure of which is incorporated herein by reference.

BACKGROUND

Field

Apparatuses and methods consistent with the exemplary embodiments relate to a display apparatus displaying an image and a control method thereof, and more particularly to a display apparatus having a structure of moving a cursor displayed on an image based on a transfer signal received from an input device to a user desired position, and a control method thereof.

Description of the Related Art

A display apparatus processes image signals input from external image sources in various methods and displays images on a display panel, e.g., a liquid crystal display (LCD), etc. A display apparatus available to general users is configured as a television (TV), a monitor, or the like. For example, a display apparatus configured as a TV conducts various processes, such as tuning and decoding, on broadcast signals received from the outside, thereby providing images of user desired broadcast channels.

In displaying images, the display apparatus is capable of displaying an object corresponding to a preset operation, for example, a hyperlink text of a webpage or an application icon of a desktop, presenting a cursor/pointer laid on an image to select the object. When a user sends a transfer signal of directing movement of a cursor through an input device configured in various forms, the display apparatus moves a cursor according to the received transfer signal.

However, it may not be easy for a user to move a cursor to a desired object through manipulation of the input device due to various factors, e.g., a configuration mode of the input device, the size of a display screen, and a distance between the user and the display screen, etc.

SUMMARY

An aspect of an exemplary embodiment provides a display apparatus including: a display unit; a communication unit which receives information about a coordinate from an input device; and an image processor which displays an image including an object and a cursor on the display unit, and moves the cursor toward the object according to a position of the object in the image with respect to information about movement corresponding to a first input coordinate at an input start point and a second input coordinate at an input termination point, wherein the first input coordinate and the second input coordinate are received from the input device through the communication unit.

The information about movement may correspond to information about moving the cursor from a first point to a second point, and may include a moving distance of the cursor between the first input coordinate ad the second input coordinate and a moving direction of the cursor between the first input coordinate and the second input coordinate.

The image processor may calculate a coordinate of a third point based on the information about movement when the cursor is moved, and based on the third point, if the object is located within a preset radius range, the image processor may move the cursor to the object.

The coordinate of the third point may be calculated to be in a same direction as the moving direction of the cursor as the cursor moves from the first point to the second point and at a multiple of the moving distance of the cursor.

The image processor may move the cursor to the third point if the object is not located within the radius range.

The image processor may control a moving speed of the cursor to decrease gradually as the cursor approaches the object.

The image processor may move the cursor to a fourth point positioned on an axis in the moving direction of the cursor if the object is not located within the radius range.

The image processor may move the cursor to the object if the object is located within the radius range based on a point on the axis in the moving direction of the cursor while the cursor moves to the fourth point.

The image processor may stop the cursor if an instruction to stop the cursor is received by the communication unit while the cursor moves to the fourth point.

The image processor may move the cursor to a fifth point if an instruction to move the cursor to the fifth point is received to the communication unit while the cursor moves to the fourth point.

The image processor may select one of a plurality of objects based on a direction of the cursor as the cursor moves and may move the cursor to the selected one of the plurality of objects if the plurality of objects is located within the radius range.

The image processor may form an ellipse having the third point as a focus and selects the one of the plurality of objects, the plurality of objects being included in the ellipse, from among the plurality of objects within the radius range.

A major axis of the ellipse may be positioned on an axis in the moving direction of the cursor.

The object may include a hyperlink of a webpage, or an icon that is selective or executable.

According to another aspect of an exemplary embodiment, there is provided a control method of controlling a display apparatus, the control method including: displaying an image including a object and a cursor; receiving a first input coordinate at an input start point and a second input coordinate at an input termination point; and moving the cursor toward the object according to a position of the object in the image with respect to information about movement corresponding to the first input coordinate and the second input coordinate.

The information about movement may correspond to a moving distance of the cursor between the first input coordinate and the second input coordinate and a moving direction of the cursor between the first input coordinate and the second input coordinate.

The moving the cursor toward the object may include: calculating a coordinate of a third point based on the information about movement when the cursor is moved; and if the object is located within a preset radius range based on the third point, moving the cursor to the object.

The control method of claim 17, wherein the calculating the coordinate of the third point comprises calculating the coordinate of the third point to be in a same direction as the moving direction of the cursor as the cursor moves from a first point to a second point and at a multiple of the moving distance of the cursor.

The moving the cursor toward the object may further include moving the cursor to the third point if the object is not located within the radius range The moving the cursor toward the object may further include moving the cursor to a fourth point positioned on an axis in the moving direction of the cursor if the object is not located within the radius range.

The moving the cursor to the fourth point positioned on the axis in the moving direction of the cursor may include moving the cursor to the object if the object is located within the radius range based on a point on the axis in the moving direction of the cursor while the cursor moves to the fourth point.

The moving the cursor to the object may include: selecting one of a plurality of objects based on a direction of the cursor as the cursor moves if the plurality of objects is located within the radius range; and moving the cursor to the selected one of the plurality of objects.

The selecting one of the plurality of objects based on the direction of the cursor as the cursor moves includes forming an ellipse having the third point as a focus; and selecting the one of the plurality of objects, the plurality of objects being included in the ellipse, from among the plurality of objects within the radius range.

The ellipse may have a preset area and a major axis of the ellipse that is positioned on an axis in the moving direction of the cursor.

Another aspect of an exemplary embodiment includes a control method of controlling a display apparatus, the method including: displaying an image including an object and a cursor; receiving an input signal from a user, the input corresponding to a drag motion; moving the cursor from a first point to a second point; determining a motion vector based on the received input signal, the first point and the second point; determining a third point based on the determined motion vector; if the object is within a predetermined radius of the third point, moving the cursor to a location corresponding to the object; and if the object is within the predetermined radius of the third point, displaying the cursor as the cursor moves from the first point to the second point and from the second point to the object.

The control method may further include: if the object is not within the predetermined radius of the third point, moving the cursor to the third point; and if the object is not within the predetermined radius of the third point, displaying the cursor as the cursor moves from the first point to the second point and from the second point to the third point.

BRIEF DESCRIPTION OF THE DRAWINGS

The above and/or other aspects will become apparent and more readily appreciated from the following description of the exemplary embodiments, taken in conjunction with the accompanying drawings, in which:

FIGS. 6 to 8 are flowcharts illustrating a control method of the display apparatus according to each exemplary embodiment.

DETAILED DESCRIPTION OF EXEMPLARY EMBODIMENTS

Figure 1:
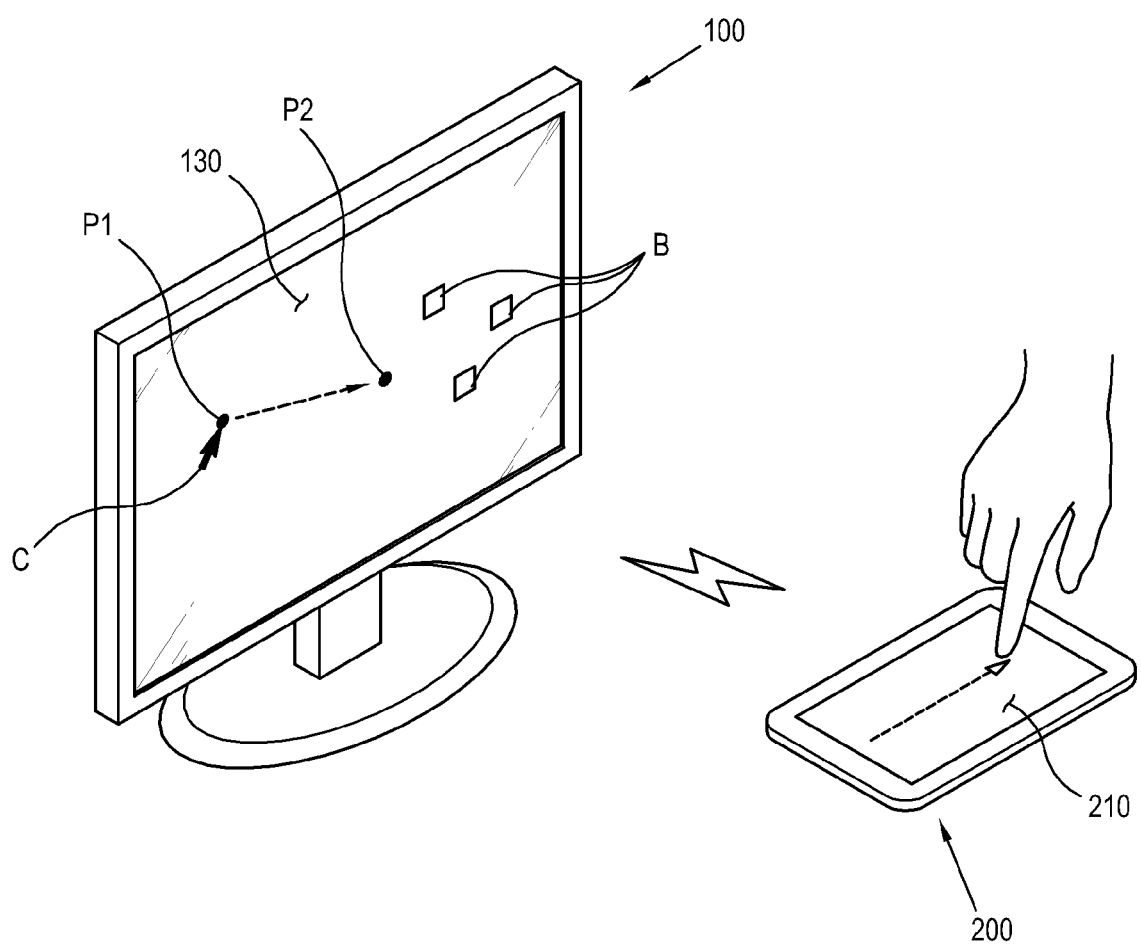
FIG. 1 shows an illustrative display apparatus and an illustrative input device according to a first exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity and conciseness, and like reference numerals refer to like elements throughout.

It will be understood that when an element is referred to as being "connected" or "coupled" to another element, it can be directly connected or coupled to the other element or intervening elements may be present. By contrast, when an element is referred to as being "directly connected" or "directly coupled" to another element, there are no intervening elements present. As used herein, the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of exemplary embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be oriented otherwise (e.g., rotated 90 degrees, or at some other orientation) and the spatially relative descriptors used herein should be interpreted accordingly.

The terminology used herein is for the purpose of describing particular embodiments only and is not intended to be limiting of exemplary embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. FIG. 1 shows an illustrative display apparatus 100 and an illustrative input device 200 according to a first exemplary embodiment.

As shown in FIG. 1, the display apparatus 100 according to the present exemplary embodiment displays images based on image signals/image data received from the outside or generated autonomously. According to the present embodiment, the display apparatus 100 is configured as a TV, without being limited thereto. Further, ideas of the present invention may be applied to various display apparatuses 100 which includes a display unit 130 capable of autonomously displaying images and has a structure of receiving a transfer signal from the input device 200. The term "unit" as used herein means a hardware component, such as a processor or circuit, and/or a software component that is executed by a hardware component such as a processor.

The display apparatus 100 displays an image on the display unit 130, and this image includes at least one object B and a cursor C laid on the image and movable.

In the present exemplary embodiment, the object B refers to an item prepared in the display apparatus 100 for performing a preset operation when the cursor C is laid on and clicks the object B. For example, when the image displayed on the display unit 130 is a webpage, the object B may be a text or an image including a hyperlink. Alternatively, when the image displayed on the display unit 130 is a desktop, the object B may be an icon for running an application. In addition, the object B may be configured in various ways, depending on the kind of image.

The input device 200 generates control signals corresponding to instructions to perform various operations of the display apparatus 100 and transmits the signals to the display apparatus 100 via a wire/wirelessly, so that the display apparatus 100 carries out a preset operation according to a control signal. The input device 200 of the present exemplary embodiment generates a transfer signal corresponding to an instruction to move the cursor C and transmits the signal to the display apparatus 100.

The transfer signal transmitted by the input device 200 includes information about movement for moving the cursor C on an image of the display unit 130 to a different position, for example, for moving the cursor C located on the image at a first point P1 to a second point P2 distant away from the first point P1. That is, the transfer signal includes a motion vector value designating a moving direction and a moving distance of the cursor C. The display apparatus 100 moves the cursor C on a second-dimensional image according to the motion vector value of the transfer signal.

The input device 200 generating a transfer signal may be configured in various forms. For example, the input device 200 may be configured as a remote controller including a touch pad or touch screen 210 enabling a drag motion by a user's finger, a portable multimedia player, a portable device, and the like.

As a user drags a fingertip on the touch pad 210 of the input device 200, the input device 200 generates a transfer signal including a motion vector value corresponding to the drag motion and transmits the generated transfer signal to the display apparatus 100. The display apparatus 100 moves the cursor C at the first point P1 to the second point P2 according to the motion vector value of the transfer signal.

That is, the input device 200 transmits a transfer signal/information about movement including a first input coordinate and a second input coordinate to the display apparatus 100, wherein the first input coordinate is a coordinate at an input start point when a user starts a drag motion and the second input coordinate is a coordinate at an input termination point when the user terminates the drag motion. Then, the display apparatus 100 moves the cursor C from the first point P1 to the second point P2 corresponding to a moving distance between the first input coordinate and the second input coordinate and a moving direction.

Figure 2:
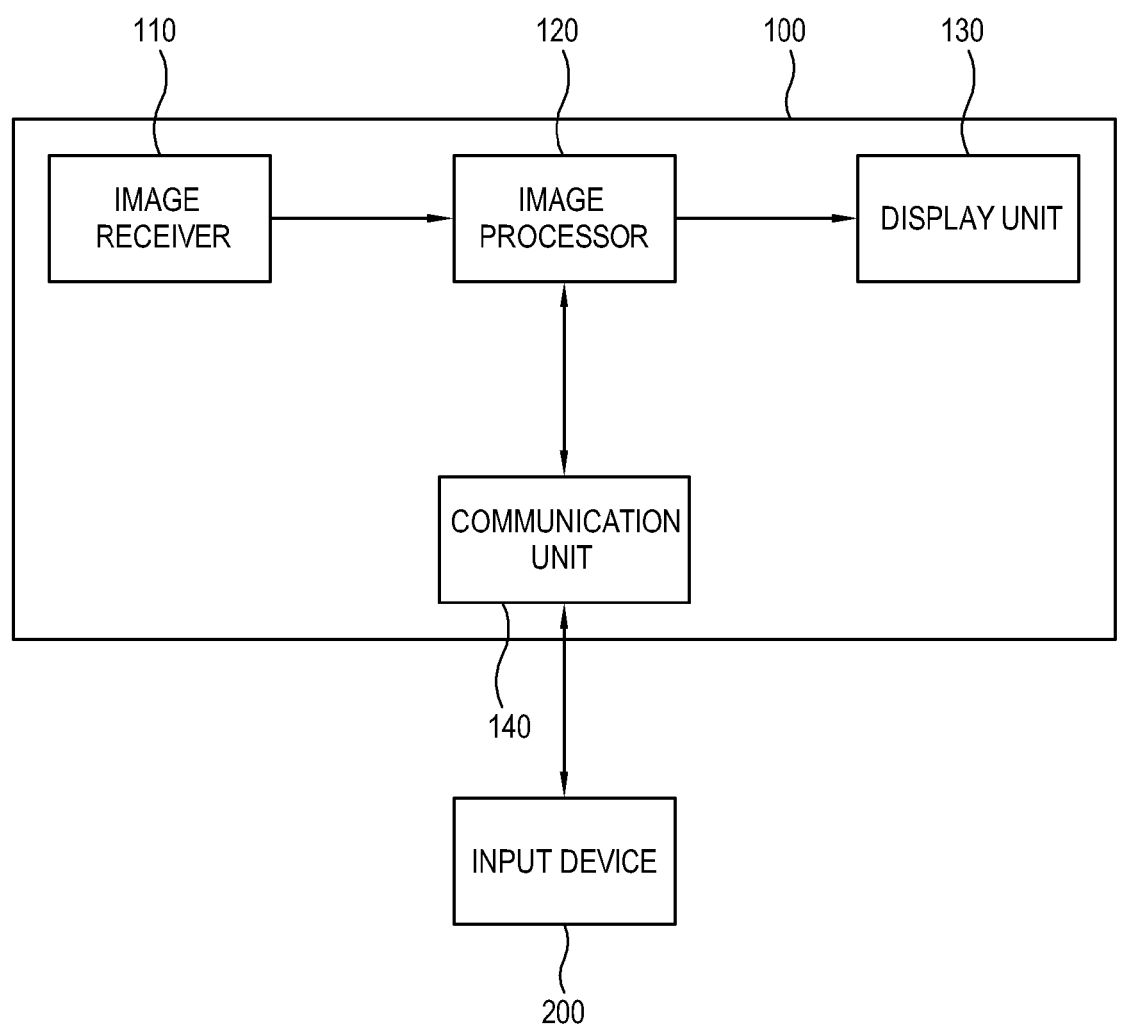
FIG. 2 is a block diagram illustrating a configuration of a display apparatus, an example of which includes the display apparatus of FIG. 1.

Hereinafter, a configuration of the display apparatus 100 is described in detail with reference to FIG. 2. FIG. 2 is a block diagram illustrating the configuration of the display apparatus 100.

As shown in FIG. 2, the display apparatus 100 includes an image receiver 110 receiving image signals from external image sources (not shown), an image processor 120 processing image signals received by the image receiver 110 according to various preset processes, a display unit 130 displaying images based on image signals processed by the image processor 120, and a communication unit 140 communicating with the input device 200 and receiving various signals/data/information from the input device 200.

The image receiver 110 receives image signals wirelessly/through a wire and transmits the signals to the image processor 120. The image receiver 110 may be configured as various forms corresponding to standards of received image signals and types of the display apparatus 100. When an image signal is a broadcast signal, the image receiver 110 includes a tuner to tune the broadcast signal by each channel.

The image receiver 110 may receive radio frequency (RF) signals transmitted from broadcasting stations (not shown) or various image signals according to composite/component video, super video, Syndicat des Constructeurs d'Appareils Radiorécepteurs et Téléviseurs (SCART), high definition multimedia interface (HDMI), DisplayPort, unified display interface (UDI) or wireless HD standards. Alternatively, the image receiver 110 may be connected to a network and receive an image data packet through the network.

The image processor 120 performs various preset image processing processes on received image signals/image data. The image processor 120 outputs processed image signals to the display unit 130, so that images based on the image signals are displayed on the display unit 130.

The image processor 120 may perform various task, without being limited to, for example, decoding corresponding to various image formats, de-interlacing, frame refresh rate conversion, scaling, noise reduction to improve image quality, and detail enhancement. The image processor 120 may be provided as a separate component which independently conducts each process or as an integrated multi-functional component, such as a system on a chip (SOC).

The image processor 120 performs preset control operations based on various control signals/commands/information received through the communication unit 140. According to the present exemplary embodiment, when receiving a transfer signal from the input device 200 through the communication unit 140, the image processor 120 moves the cursor C based on a motion vector value of the received transfer signal, which will be described in detail.

The display unit 130 displays images based on image signals output from the image processor 120. The display unit 130 may be configured in various display modes using various display technologies, such as liquid crystals, plasma, light emitting diodes, organic light emitting diodes, a surface conduction electron emitter, a carbon nanotube, nanocrystals, or the like, without being limited thereto.

The communication unit 140 receives diverse signals/data/information from the input device 200 based on various wire-based/wireless communications standards and transmits them to the image processor 120. Alternatively, the communication unit 140 transmits signals/data/information of the display apparatus 100 to the input device, thus realizing two-way communication between the display apparatus 100 and the input device.

The communication unit 140 according to the present exemplary embodiment receives a transfer signal from the input device 200 and transmits the signal to the image processor 120.

With this configuration, to move the cursor C on the display unit 130 onto the particular object B, a user drags a fingertip on the touch pad 210 of the input device 200.

However, due to various environmental factors, e.g., the user's manipulation environment of the input device 200, a distance between a user manipulating the input device 200 and the display apparatus 100 and the screen size of the display unit 130, it is not easy for the user to move the cursor C to a desired position. For example, as a direction and a moving distance are designated by a user dragging on the input device 200, it may be difficult to move the cursor C to an exact desired position.

Thus, according to the present exemplary embodiment, when receiving the first input coordinate at the input start point and the second input coordinate at the input termination point from the input device 200, the image processor 120 generates an event of moving the cursor C toward the object B according to a position of the object B within the image with respect to the information about movement corresponding to the first input coordinate and the second input coordinate.

In detail, when receiving a transfer signal for moving the cursor C to a first position, the image processor 120 calculates a coordinate area different from the first position based on a motion vector value of the transfer signal, and moves the cursor C toward the object B if it is determined that the object B is located within the calculated coordinate area. Here, the coordinate area different from the first position means that the coordinate area does not include the first position on the display unit 130 or the image, that is, the coordinate area is distant from the first position.

Accordingly, a user may easily move the cursor C to the desired object B, thereby contributing to the user's convenience.

Such operations of the image processor 120 according to the present exemplary embodiment may be activated only in a particular mode of the display apparatus 100 and be inactivated when the display apparatus 100 is not in the particular mode. That is, when the display apparatus 100 is not in a mode of designating a method of moving the cursor C described above, the image processor 120 may just move the cursor C to the first position according to the transfer signal and then stop the cursor C.

Figure 3:
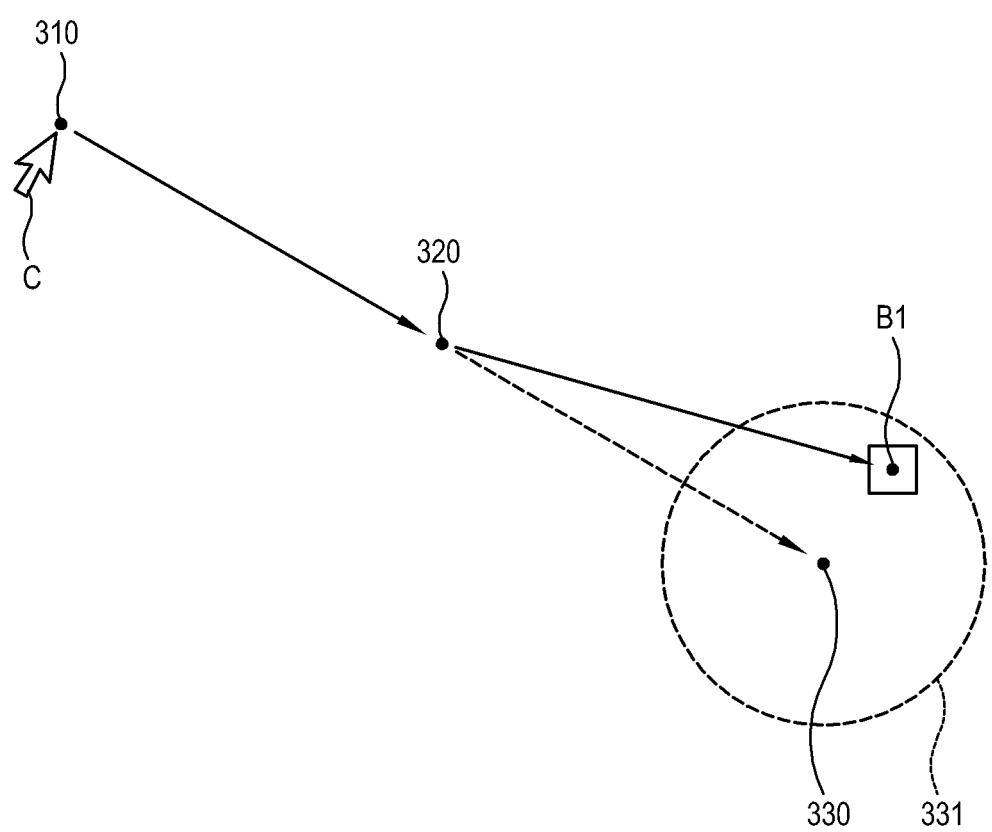
FIG. 3 shows an illustrative method of moving a cursor in a display apparatus, an example of which includes the display apparatus of FIG. 1.

Hereinafter, a method of the image processor 120 moving the cursor C according to the present exemplary embodiment is described with reference to FIG. 3. FIG. 3 shows an illustrative method of moving a cursor C on an image according to the present exemplary embodiment.

As shown in FIG. 3, when a user makes a drag motion on the touch pad 210 of the input device 200, the input device 200 generates and transmits a transfer signal according to the drag motion made by the user. The transfer signal includes information about a moving direction and a moving distance for determining a moving direction and a moving distance of the cursor C, and the moving direction and the moving distance correspond to a drag direction and a drag distance in the drag motion made by the user.

The image processor 120 extracts a motion vector value for moving the cursor C from a first point 310 to a second point 320 from the received transfer signal, and moves the cursor C from the first point 310 to the second point 320 first and calculates a coordinate of a third point 330 based on the motion vector value.

Various processes may be employed for calculating the coordinate of the third point 330. For example, the image processor 120 calculates the coordinate of the third point 330 to be in the same direction as a moving direction of the cursor C and at a preset multiple of a moving distance of the cursor C from the motion vector value including the moving direction and the moving distance of the cursor C. Here, the preset multiple may not necessarily be an integer but may possibly be a decimal value.

According to the present exemplary embodiment, the image processor 120 calculates, as the third point 330, a place at the same distance from the second point 320 as a distance between the first point 310 and the second point 320 on an axis of the cursor C in the moving direction, that is, an extension from a line connecting the first point 310 and the second point 320. However, this example is given merely for the purposes of illustration and is not to be construed as limiting the scope of the exemplary embodiments.

When the coordinate of the third point 330 is determined, the image processor 120 determines whether the object B1 is positioned within a predetermined range 331 based on the third point 330. The range 331 is a radius of a preset pixel based on the third point 330.

Here, the object B1 may be determined by various methods for application. For example, when an image displayed on the display unit 130 is a webpage, the image processor 120 analyzes a script of an internal source of the webpage to determine a coordinate of the object B1 in the image.

When the object B1 is located within the range 331, the image processor 120 moves the cursor C located at the second point 320 to the object B1, not to the third point 330.

Here, as the cursor C approaches the object B1, the image processor 120 sets a moving speed of the cursor C to be slow gradually or by stages. Accordingly, the user may intuitively perceive that the cursor C approaches the object B1.

However, when the object B1 is not located within the range 331, the image processor 120 moves the cursor C positioned at the second point 320 to the third point 330.

In this way, the user may easily move the cursor C to the desired object B1 through an input operation of the input device 200.

Figure 4:
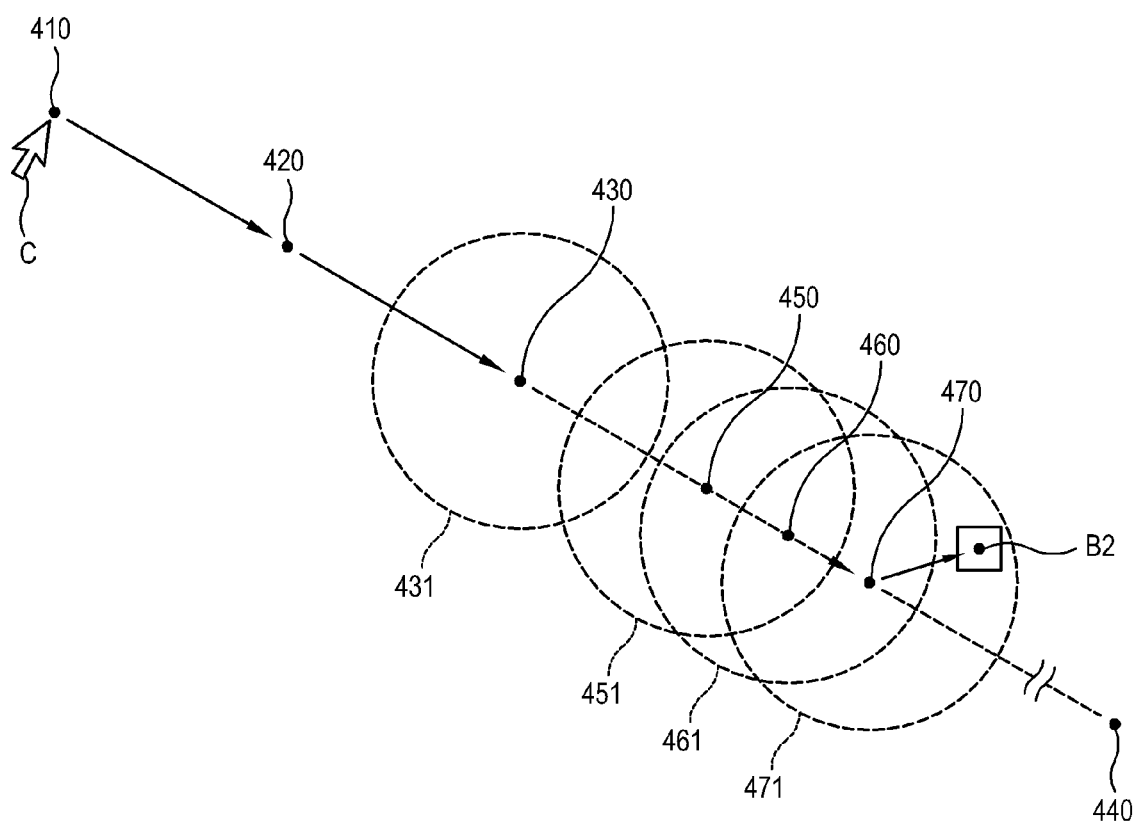
FIG. 4 shows an illustrative method of moving a cursor in a display apparatus according to a second exemplary embodiment.

It should be noted that the ideas of the present inventive concept are not limited to the first exemplary embodiment. Hereinafter, an exemplary embodiment of the display apparatus 100 moving a cursor C according to a different method from that of the first exemplary embodiment is described with reference to FIG. 4. FIG. 4 shows an illustrative method of the image processor 120 moving a cursor C according to the second exemplary embodiment.

As shown in FIG. 4, the image processor 120 extracts a motion vector value for moving the cursor C from a first point 410 to a second point 420 from a received transfer signal, and moves the cursor C from the first point 410 to the second point 420 first and calculates a coordinate of a third point 430 based on the motion vector value.

The image processor 120 calculates, as the third point 430, a place at the same distance from the second point 420 as a distance between the first point 410 and the second point 420 on an axis of the cursor C in a moving direction, i.e., an extension from a line connecting the first point 410 and the second point 420.

The image processor 120 determines whether an object B2 is located within a radius 431 based on the third point 430, and moves the cursor C to the object B2 if the object B2 is located within the radius.

However, when the object B2 is not located within the radius 431, the image processor 120 moves the cursor C from the second point 420 toward a fourth point 440 positioned on the axis in the moving direction according to the motion vector value of the transfer signal. The axis in the moving direction is a line connecting the first point 410, the second point 420, the third point 430 and the fourth point 440, and the points 410, 420, 430 and 440 are sequentially disposed on the axis in the moving direction.

A position of the fourth point 440 is not particularly limited but may be in an edge area of the display unit 130 or an image.

The image processor 120 moves the cursor C from the third point 430 to the fourth point 440. Further, while moving the cursor C, the image processor 120 determines whether the object B2 is located within respective ranges 451, 461 and 471 based on points 450, 460 and 470 on the moving axis.

As shown in FIG. 4, unlimited points 450, 460 and 470 are present between the third point 430 and the fourth point 440 on the axis in the moving direction of the cursor C, and the image processor 120 continually determines whether there exists the object B2 within the radiuses 451, 461 and 471 based on the respective points 450, 460 and 470 while the cursor C moves on the axis in the moving direction.

The present exemplary embodiment illustrates three points 450, 460 and 470 only, which are given merely for the purposes of illustration and are not to be construed as limiting the scope of the exemplary embodiment.

When it is determined that the object B2 is located within a radius 471 based on a point 470 while the cursor C moves, the image processor 120 moves the cursor C to the object B2.

Here, a speed of the cursor C moving on the axis in the moving direction is set to be substantially the same as a speed of the cursor C moving from the first point to the second point 420. Meanwhile, the object B2 is determined to exist, the speed of the cursor C is set to decrease gradually as the cursor C approaches the object B2.

If the object B2 is determined not to exist until the cursor C reaches the fourth point 440, the image processor 120 stops the cursor C at the fourth point 440. Alternatively, when an instruction to stop the cursor C or an instruction to move the cursor C in a different direction is received from the input device 200 through the communication unit 140 while the cursor C moves along the axis in the moving direction, the image processor 120 stops the cursor C or moves the cursor C in the different direction according to each corresponding instruction.

Figure 5:
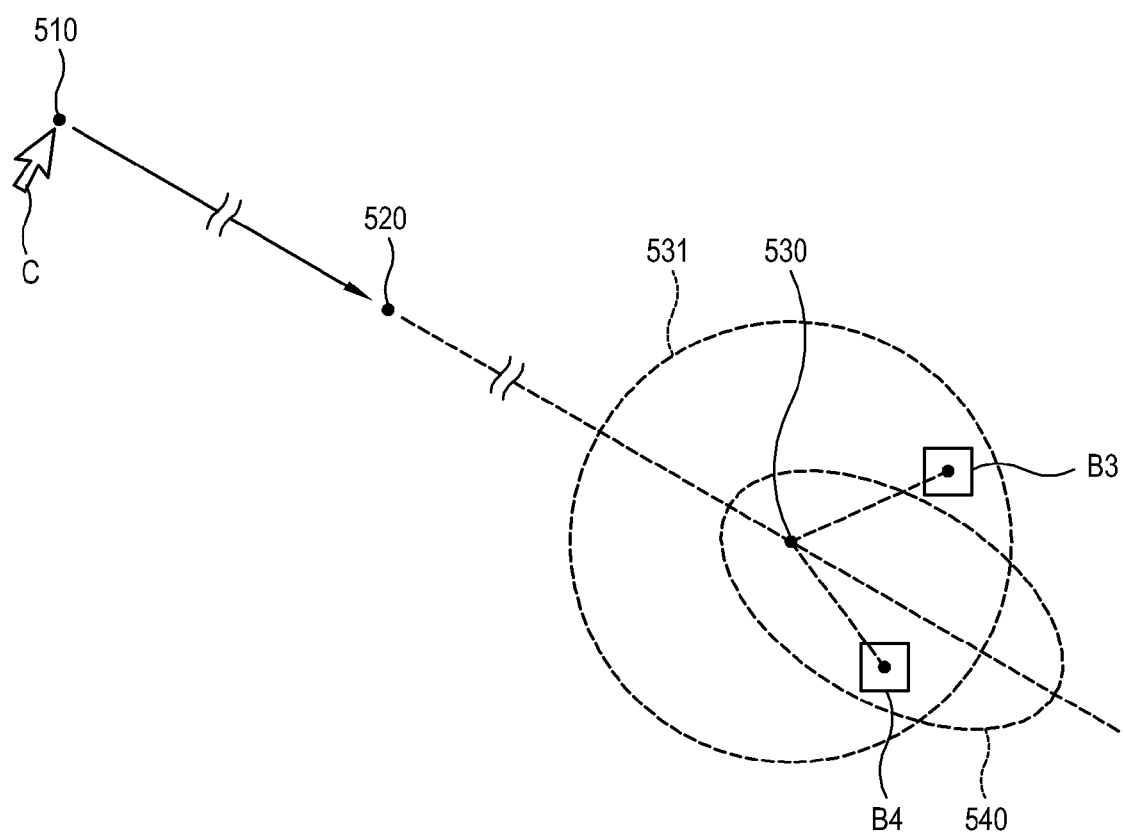
FIG. 5 shows an illustrative method of moving a cursor in a display apparatus according to a third exemplary embodiment.

Although the aforementioned exemplary embodiments illustrate that a single object exists within a radius, a plurality of objects may be present in the range, which is described in the following exemplary embodiment with reference to FIG. 5. FIG. 5 shows an illustrative method of the image processor 120 moving a cursor C according to a third exemplary embodiment.

As shown in FIG. 5, the image the image processor 120 extracts a motion vector value for moving the cursor C from a first point 510 to a second point 520 from a received transfer signal, and moves the cursor C from the first point 510 to the second point 520 first and calculates a coordinate of a third point 530 based on the motion vector value. The coordinate of the third point 530 may be calculated by the same method as described in the foregoing exemplary embodiments.

The image processor 120 determines whether there are objects B3 and B4 within a radius 531 based on the third point 530. If a plurality of objects B3 and B4 are found within the radius 531, the image processor 120 determines which object B3 or B4 is in a similar direction to a moving direction of the cursor C based on the direction of the moving cursor C and selects an object B4 which is determined to be in a more similar direction. Then, the image processor 120 moves the cursor C to the selected object B4.

The direction of the cursor C may be checked by various methods, one of which is illustrated as follows.

The image processor 120 forms an ellipse 540 having the third point 530 as one focus and a preset area. Here, the ellipse 540 is disposed such that its major axis is positioned on an axis in the moving direction of the cursor C, that is, on a straight line connecting the first point 510, the second point 520 and the third point 530, and one of the two foci which is other than the third point is in the moving direction of the cursor C.

The image processor 120 forms the ellipse 540 having the preset area in the aforementioned conditions and determines that the object B4 included in the ellipse 540 is in a relatively similar direction to the moving direction of the cursor C among the plurality of objects B3 and B4.

If there is no objects B3 and B4 within the ellipse 540 or a plurality of objects B3 and B4 are present in the ellipse 540, the image processor 120 reduces or increases the area of the ellipse 540 until one object B4 is found within the ellipse 540, maintaining the above conditions.

In this manner, the image processor 120 selects one object B4 from among the plurality of objects B3 and B4.

Figure 6:
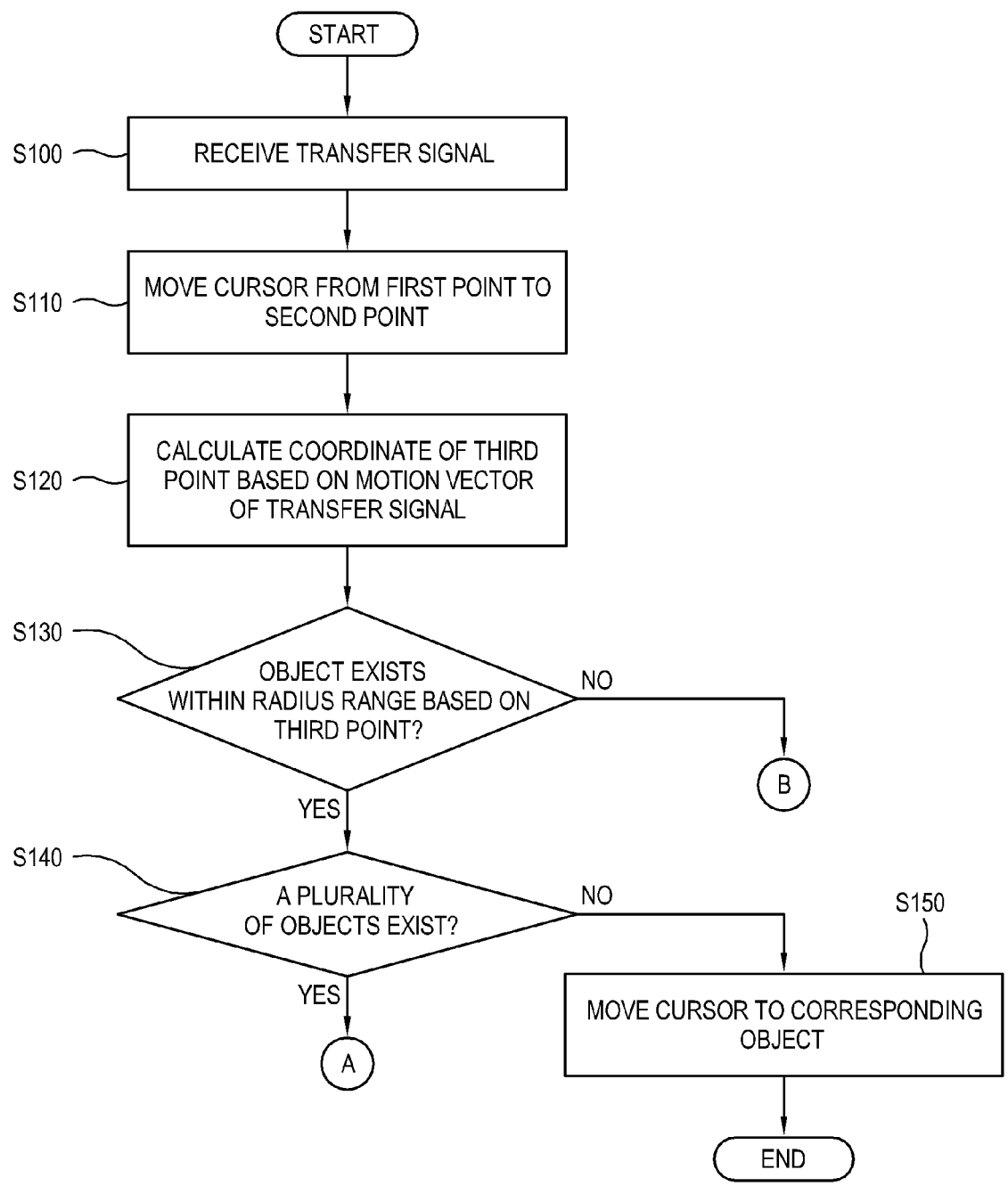
Figure 7:
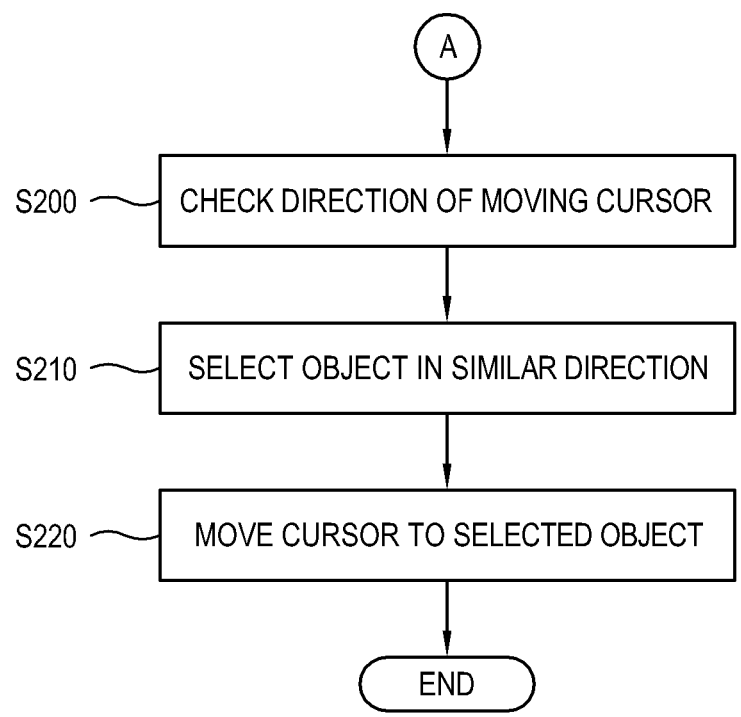

Hereinafter, a control method of the display apparatus 100 according to the exemplary embodiments is described with reference to FIGS. 6 to 8. FIGS. 6 to 8 are flowcharts illustrating the control method.

As shown in FIG. 6, when a transfer signal is received (S100), the image processor 120 moves a cursor from a first point to a second point according to the transfer signal (S110). Then, the image processor 120 calculates a coordinate of a third point based on a motion vector value of the transfer signal (S120).

The image processor 120 determines whether there is an object within a predetermined radius based on the third point (S130).

When an object is present within the radius, the image processor 120 determines whether there is a plurality of objects (S140).

When there is only one object, the image processor 120 moves the cursor to the object (S150).

Meanwhile, as shown in FIG. 7, when a plurality of objects are present within the radius at S140, the image processor 120 checks a direction of the moving cursor (S200).

The image processor 120 selects an object in a similar direction to the checked direction among the plurality of objects (S210) and moves the cursor to the selected object (S220).

Meanwhile, as shown in FIG. 8, it is considered that there is no object within the radius at S130 of FIG. 6. In this case, the display apparatus 100 operates differently depending on a first mode or a second mode. The first mode is based on the exemplary embodiment with reference to FIG. 3, while the second mode is based on the exemplary embodiment with reference to FIG. 4.

In the first mode, the image processor 120 moves the cursor to the third point and then stops the cursor (S300).

In the second mode, the image processor 120 starts moving the cursor from the second point to a fourth point via the third point (S310).

While the cursor moves to the fourth point, the image processor determines whether there is an object within a radius of a point according to an axis of the cursor moving (S320).

When an object exists within the radius, the image processor 120 moves the cursor to the object (S330). However, when there is no object within the radius, the image processor 120 stops the cursor when the cursor reaches the fourth point (S340).

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus comprising:
    a display unit;
    a communication unit which is configured to receive information about a user input from an external input device, the user input comprising an input start point and an input end point; and
    at least one processor which is configured to process an image including at least one object and a cursor to be displayed on the display unit,
    to determine a predicted moving point of the cursor in the image based on the input start point, a moving direction and a moving distance of the user input received from the external input device in the image, and
    to move the cursor to a position of the at least one object neighboring the predicted moving point in the image,
    wherein the moving distance is a distance between the input start point and the input end point.

2. The display apparatus of claim 1, wherein the at least one processor calculates a coordinate of the predicted moving point of the cursor in the image based on a moving distance of the cursor between a first input of the input start point and a second input of the input end point and the moving direction of the cursor between the first input and the second input.

3. The display apparatus of claim 2, wherein the at least one image processor calculates a coordinate of a third point of the predicted moving point based on the first point of the first input and a second point of the second input when the cursor is moved, and based on the third point, if the object is located within a preset radius range based on the third point, the image processor moves the cursor to the object.

4. The display apparatus of claim 3, wherein the coordinate of the third point is calculated to be same distance from the second point as the moving distance between the first point and the second point on the axis of the cursor in the moving direction.

5. The display apparatus of claim 3, wherein the at least one image processor moves the cursor to the third point if the object is not located within the radius range.

6. The display apparatus of claim 3, wherein the at least one image processor decreases a moving speed of the cursor as the cursor approaches the object.

7. The display apparatus of claim 3, wherein the at least one image processor moves the cursor to a fourth point positioned on an axis in the moving direction of the cursor if the object is not located within the radius range.

8. The display apparatus of claim 7, wherein the at least one image processor moves the cursor to the object if the object is located within the radius range based on a point on the axis in the moving direction of the cursor while the cursor moves to the fourth point.

9. The display apparatus of claim 7, wherein the at least one image processor stops the cursor if an instruction to stop the cursor is received by the communication unit while the cursor moves to the fourth point.

10. The display apparatus of claim 7, wherein the at least one image processor moves the cursor to a fifth point if an instruction to move the cursor to the fifth point is received to the communication unit while the cursor moves to the fourth point.

11. The display apparatus of claim 3, wherein the at least one image processor selects one of a plurality of objects based on a direction of the cursor as the cursor moves and moves the cursor to the selected one of the plurality of objects if the plurality of objects is located within the radius range.

12. A display apparatus comprising:
    a display unit;
    a communication unit which is configured to receive information about a user input from an external input device; and
    at least one processor which is configured to process an image including at least one object and a cursor to be displayed on the display unit,
    wherein the at least one processor is further configured to determine a predicted moving point of the cursor in the image based on an input start point and a moving direction of the user input received from the external input device in the image, and move the cursor to a position of the at least one object neighboring the predicted moving point in the image, and
    wherein the at least one image processor forms an ellipse having the third point as a focus and selects the one of the plurality of objects, the plurality of objects being included in the ellipse, from among the plurality of objects within the radius range.

13. The display apparatus of claim 12, wherein a major axis of the ellipse is positioned on an axis in the moving direction of the cursor.

14. The display apparatus of claim 1, wherein the object comprises a hyperlink of a webpage, or an icon that is selective or executable.

15. A control method of controlling a display apparatus, the method comprising:
    displaying an image including at least one object and a cursor;
    receiving user input comprising an input start point and an input end point in the image from the external input device;
    determining a predicted moving point of the cursor based on the input start point and a moving direction and a moving distance of the user input in the image; and
    moving the cursor to a position of the at least one object neighboring the predicted moving point in the image,
    wherein the moving distance is a distance between the input start point and the input end point.

16. The control method of claim 15, wherein the determining comprises calculating a coordinate of the predicted moving point of the cursor in the image based on the moving distance of the cursor between a first input of the input start point and a second input of the input end point and the moving direction of the cursor between the first input and the second input.

17. The control method of claim 16, wherein the determining comprises calculating a coordinate of a third point of the predicted moving point based on the first point of the first input and a second point of the second input when the cursor is moved; and wherein, if the object is located within a preset radius range based on the third point, moving the cursor to the object.

18. The control method of claim 17, wherein the calculated coordinate of the third point is at same distance from the second point as the distance between the first point and the second point on the axis of the cursor in the moving direction.

19. The control method of claim 17, wherein the moving the cursor toward the object further comprises moving the cursor to the third point if the object is not located within the radius range.

20. The control method of claim 17, wherein the moving the cursor toward the object further comprises moving the cursor to a fourth point positioned on an axis in the moving direction of the cursor if the object is not located within the radius range.

21. The control method of claim 20, wherein the moving the cursor to the fourth point positioned on the axis in the moving direction of the cursor comprises moving the cursor to the object if the object is located within the radius range based on a point on the axis in the moving direction of the cursor while the cursor moves to the fourth point.

22. The control method of claim 17, wherein the moving the cursor to the object comprises:

selecting one of a plurality of objects based on a direction of the cursor as the cursor moves if the plurality of objects is located within the radius range; and moving the cursor to the selected one of the plurality of objects.

23. The control method of claim 22, wherein the selecting one of the plurality of objects based on the direction of the cursor as the cursor moves comprises forming an ellipse having the third point as a focus; and selecting the one of the plurality of objects, the plurality of objects being included in the ellipse, from among the plurality of objects within the radius range.

24. The control method of claim 23, wherein the ellipse has a preset area and a major axis of the ellipse is positioned on an axis in the moving direction of the cursor.

25. A control method of controlling a display apparatus, the method comprising:

displaying an image including an object and a cursor;

receiving an input signal from a user, the input corresponding to a drag motion;

moving the cursor from a first point to a second point;

determining a motion vector based on the received input signal, the first point and the second point;

determining a third point based on the determined motion vector, coordinates of the third point is calculated to be a preset multiple of a distance between the first point and the second point on an extension line connecting the first point and the second point;

if the object is within a predetermined radius of the third point, moving the cursor to a location corresponding to the object;

if the object is within the predetermined radius of the third point, displaying the cursor as the cursor moves from the first point to the second point and from the second point to the object; and if the object is outside the predetermined radius of the third point, moving the cursor to the third point.

26. The control method of claim 25, further comprising:

if the object is not within the predetermined radius of the third point, displaying the cursor as the cursor moves from the first point to the second point and from the second point to the third point.

27. The display apparatus of claim 1, wherein the image processor is further configured to determine one of: a first mode and a second mode based on user input and wherein, in response to the image processor determining the first mode, the image processor displays the cursor at the predicted moving point and in response to the image processor determining the second mode, the image processor displays the cursor at a second point of an input termination point.

28. A display apparatus comprising:

a display unit;

a communication unit which is configured to receive information about a user input from an external input device; and at least one processor which is configured to process an image including at least one object and a cursor to be displayed on the display unit, wherein the at least one processor is further configured to determine a predicted moving point of the cursor in the image based on an input start point and a moving direction of the user input receiver from the external input device in the image, and move the cursor to a position of the at least one object neighboring the predicted moving point in the image, wherein the third point is placed on an extension line connecting a first point and a second point in the moving direction of the cursor, and wherein the image processor further calculates a range for detecting the object based on a radius from a center which is the predicted moving point.

29. The display apparatus of claim 28, wherein if the image processor determines that a plurality of objects exist in the range, selecting one of the plurality of objects based on the moving direction of the cursor and moving the cursor to the selected object.

* * * * *